(12) United States Patent
Nilson

(10) Patent No.: US 9,402,500 B2
(45) Date of Patent: Aug. 2, 2016

(54) BREWER UNIT FOR A HOT BEVERAGE DISPENSING MACHINE

(71) Applicant: Crem International Aktiebolag, Aemotfors (SE)

(72) Inventor: Jarl Nilson, Arvika (SE)

(73) Assignee: Crem International Aktiebolag, Amotfors (SE)

( * ) Notice: Subject to any disclaimer, the term of this patent is extended or adjusted under 35 U.S.C. 154(b) by 0 days.

(21) Appl. No.: 14/430,666

(22) PCT Filed: Sep. 25, 2012

(86) PCT No.: PCT/SE2012/051015
§ 371 (c)(1),
(2) Date: Mar. 24, 2015

(87) PCT Pub. No.: WO2014/051474
PCT Pub. Date: Apr. 3, 2014

(65) Prior Publication Data
US 2015/0245732 A1  Sep. 3, 2015

(51) Int. Cl.
| | | |
|---|---|---|
| A47J 31/44 | (2006.01) | |
| A47J 31/40 | (2006.01) | |
| F16H 35/06 | (2006.01) | |
| F16H 57/00 | (2012.01) | |
| G05G 5/06 | (2006.01) | |
| B29C 49/00 | (2006.01) | |
| G11B 17/03 | (2006.01) | |
| A47J 31/36 | (2006.01) | |
| A47J 31/18 | (2006.01) | |

(52) U.S. Cl.
CPC . *A47J 31/36* (2013.01); *A47J 31/18* (2013.01)

(58) Field of Classification Search
None
See application file for complete search history.

(56) References Cited

U.S. PATENT DOCUMENTS 3,356,011 A * 12/1967 Parraga ............... A47J 31/3614
99/287
4,562,496 A * 12/1985 Saito .................. G11B 15/6656
360/85

(Continued)

FOREIGN PATENT DOCUMENTS

| EP | 0473289 A1 | 3/1992 |
|---|---|---|
| EP | 0587035 A1 | 3/1994 |
| WO | WO 2007/027206 A2 | 3/2007 |

OTHER PUBLICATIONS

International Searching Authority, International Search Report and Written Opinion for PCT/SE2012/051015, May 23, 2013, 9 pages, Swedish Patent and Registration Office, Sweden.

*Primary Examiner* — David Angwin
*Assistant Examiner* — Gyounghyun Bae
(74) *Attorney, Agent, or Firm* — Alston & Bird LLP

(57) ABSTRACT

A brewer unit for a hot beverage dispensing machine includes an upper cylinder (30) for receiving and containing hot water and a brewing material and having an open lower end, a coaxial lower cylinder (40) having an open upper end, a filter unit (43) mounted over the upper end of said lower cylinder (40) preventing passage of the brewing material therethrough, and a reciprocal piston (41) fitted in the lower cylinder (40) for creating a vacuum therein to suck freshly made beverage through the filter unit (43). A drive shaft (14) makes the piston (41) reciprocate and also drives a first cam mechanism for lifting the upper cylinder (30) from the filter unit (43) and a second cam mechanism for moving a scraper unit (5) over the filter unit (43) to discharge spent brewing material therefrom.

11 Claims, 9 Drawing Sheets

(56) References Cited

U.S. PATENT DOCUMENTS

| | | | |
|---|---|---|---|
| 4,672,476 A * | 6/1987 | Saito | G11B 15/6656 |
| | | | 360/85 |
| 4,709,625 A | 12/1987 | Layre et al. | |
| 4,763,567 A * | 8/1988 | Dalquist, III | A23L 1/1815 |
| | | | 366/247 |
| 4,903,586 A | 2/1990 | King | |
| 5,111,740 A * | 5/1992 | Klein | A47J 31/005 |
| | | | 99/295 |
| 5,349,897 A | 9/1994 | King et al. | |
| 5,444,585 A * | 8/1995 | Baek | G11B 15/6653 |
| | | | 360/85 |
| 5,486,958 A * | 1/1996 | Choi | G11B 15/442 |
| | | | 360/85 |
| 5,490,019 A * | 2/1996 | Konishi | G11B 15/22 |
| | | | 360/130.23 |
| 5,638,739 A * | 6/1997 | Shaanan | A47J 31/18 |
| | | | 99/287 |
| 5,852,537 A * | 12/1998 | Suzuki | G11B 15/103 |
| | | | 360/137 |
| 7,318,360 B2 * | 1/2008 | Ikeya | F16H 63/14 |
| | | | 74/337.5 |
| 7,412,909 B2 * | 8/2008 | Kawakita | F16H 29/04 |
| | | | 464/161 |
| 2002/0002913 A1 * | 1/2002 | Mariller | A47J 31/3633 |
| | | | 99/495 |
| 2004/0166938 A1 * | 8/2004 | Hojo | A63B 69/04 |
| | | | 463/36 |
| 2009/0293736 A1 * | 12/2009 | Jarisch | A47J 31/3633 |
| | | | 99/295 |

\* cited by examiner

BREWER UNIT FOR A HOT BEVERAGE DISPENSING MACHINE

CROSS REFERENCE TO RELATED APPLICATIONS

This application is a National Stage Application, filed under 35 U.S.C. §371, of International Application No. PCT/SE2012/051015, filed Sep. 25, 2012; the contents of which are hereby incorporated by reference in their entirety.

BACKGROUND

1. Related Field

The present invention relates to a brewer unit for a hot beverage dispensing machine and including an upper cylinder for receiving and containing hot water and a brewing material and having an open lower end, a coaxial lower cylinder having an open upper end, a filter unit mounted over the upper end of said lower cylinder preventing passage of the brewing material therethrough, a reciprocal piston fitted in the lower cylinder, a rotary drive shaft connected to the piston by a crank and a piston rod to reciprocate the piston, a first mechanism for lifting the upper cylinder from the filter unit, a scraper unit, and a second mechanism for moving the scraper unit across the filter unit to remove spent brewing material therefrom, said two mechanisms being driven from the drive shaft.

2. Description of Related Art

EP 0 473 289 A1 discloses a brewer unit for a hot drinks dispensing machine includes a brewing cylinder having a pressure-applying piston and into which tea leaf or ground coffee and hot water are introduced, the base of the cylinder being a filter screen. The base and cylinder walls are movable relative to each other between a position of sealing engagement and a spaced-apart position and a wiper arm is positioned externally of the cylinder adjacent to the filter. In use, the piston applies pressure to the cylinder contents while the base and cylinder are in sealing engagement, whereby brewed beverage is forced through the filter, and the cylinder and base then move apart to allow the wiper arm to traverse the filter in the space formed, to remove spent tea leaf or coffee grounds therefrom in readiness for the next brewing cycle.

U.S. Pat. No. 4,903,586 discloses a beverage brewing machine which has upper and lower brewing chambers which are moveable relative to each other so as to clamp a strip-shaped filter there between during the brewing process and the chambers can be separated so as to allow the filter strip to be removed from the brewing chamber and the beverage residual wiped therefrom after which the filter strip is returned to the brewing chambers which are then resealed for the next cycle. A hold down grid engages the top surface of the filter to hold it down as a piston moves in the lower chamber upwardly to force air through the filter to agitate the beverage. When the piston reaches top dead center, the hold down grid is lifted. When the piston passes the opening the brewed coffee is poured. A loose connection is provided between the connecting rod for the piston and the driving crank arm so that the piston remains longer at the top and bottom of its stroke.

U.S. Pat. No. 5,349,897 discloses an apparatus for brewing coffee, tea or other beverages that has upper and lower chambers that move relative to each other. When the upper and lower chambers are joined, coffee and water are supplied to the upper brewing chamber which passes through a filter mounted on the top of the lower brewing chamber into the lower brewing chamber and the coffee grounds remain on the filter. A piston in the lower chamber forces air through the liquid to agitate it and sucks it through the filter into the lower chamber. The coffee flows from the lower chamber and then a single push rod separates the upper and lower chambers. A wiper blade then removes the coffee grounds from the filter while the chambers are separated, after which the push rod reseals the upper and lower chambers together for the next brewing cycle.

BRIEF SUMMARY

A main object of the present invention is to simplify the design of the brewer unit by greatly reducing the number of used components.

In a brewer unit of the kind referred to in the first paragraph above, this object is achieved in accordance with the present invention in that the brewer unit further comprises
a first gear fixed to the drive shaft,
said first mechanism including a first cam mechanism having a first cam surface member and a first cam follower member cooperating with the first cam surface member, one member being provided on the first gear and the other on a pivotal lever, said pivotal lever being operatively connected to the upper cylinder for lifting and lowering it,
a second gear smaller than the first one and meshing therewith to be rotated thereby and having half as many teeth as the first one,
said second mechanism including a second cam mechanism having a second cam surface member and a second cam follower member cooperating with the second cam surface member, one of the members in the second cam mechanism being provided on a side of the second gear and the other on a pivotal arm, said pivotal arm being operatively connectable to the scraper unit for moving the scraper unit across the filter unit to remove spent brewing material therefrom when the upper cylinder is lifted.

The simplified design according to the present invention makes it possible to reduce the number of components from about 90 in a brewer marketed by a competitor to about 30.

Preferably, the brewer unit further comprises:
a stationary main frame carrying the two toothed gears and the lower cylinder; and
a reciprocal guide plate movably carried by the main frame and carrying the upper cylinder.

Then, the pivotal lever of the first mechanism suitably has a first end pivotally attached to the main frame and a second end movably attached to the guide plate for producing a reciprocal movement of the guide plate with the upper cylinder upon rotation of the larger first toothed gear.

Suitably, the first cam surface member is a groove provided in a side surface of the larger toothed gear and the first cam follower member includes a first stub shaft provided between the two ends of the pivotal lever. To reduce the friction between said members of the first mechanism, an antifriction bearing may be mounted on the first stub shaft.

Further, the pivotal arm of the second mechanism suitably has a first end pivotally attached to the guide plate and a second end, which during its movements grips the scraper unit for producing a reciprocal movement of thereof across the filter unit upon completing two revolutions of the smaller toothed gear.

Suitably, a first revolution of the smaller toothed gear produces a longitudinal reciprocal relative motion of the pivotal arm without gripping the scraper unit, and the second revolution produces an angular reciprocal motion of the pivotal arm to move the scraper unit over the filter unit, the second cam surface member includes a second stub shaft and the second cam follower member is an extended internal opening in the pivotal arm. To reduce the friction between said members of the second mechanism, an antifriction bearing may be mounted on the second stub shaft.

Then, the scraper unit has two axial ends, one of the ends has a projecting stud, and the free end of the pivotal arm is forked for engaging the projecting stud between the fork prongs during the second revolution of the smaller toothed gear.

Preferably, the scraper unit starts scraping when it starts moving.

The scraper unit then suitably includes a scraper that is pivotally mounted in a scraper bracket carrying the projecting stud. The scraper has a longitudinal axis and a generally L-shaped cross-section, and an arm that interconnects the scraper and the guide plate to make the scraper rotate about one eighth of a revolution around its longitudinal axis upon lifting of the upper cylinder. Thus, the scraper does not make contact with the filter unit all the time but only upon lifting of the upper cylinder, and during the return stroke of the scraper the scraper is pivoted upward from the filter unit.

As a worker skilled in the art immediately realizes without any inventive effort, some of the characterizing features above are useful also in other brewer units for hot beverage dispensing machines than the ones having the described first and second mechanisms.

BRIEF DESCRIPTION OF THE FIGURES

In the following, the invention will be described in more detail with reference to preferred embodiments and the appended drawings.

DETAILED DESCRIPTION OF VARIOUS EMBODIMENTS

Figure 1:
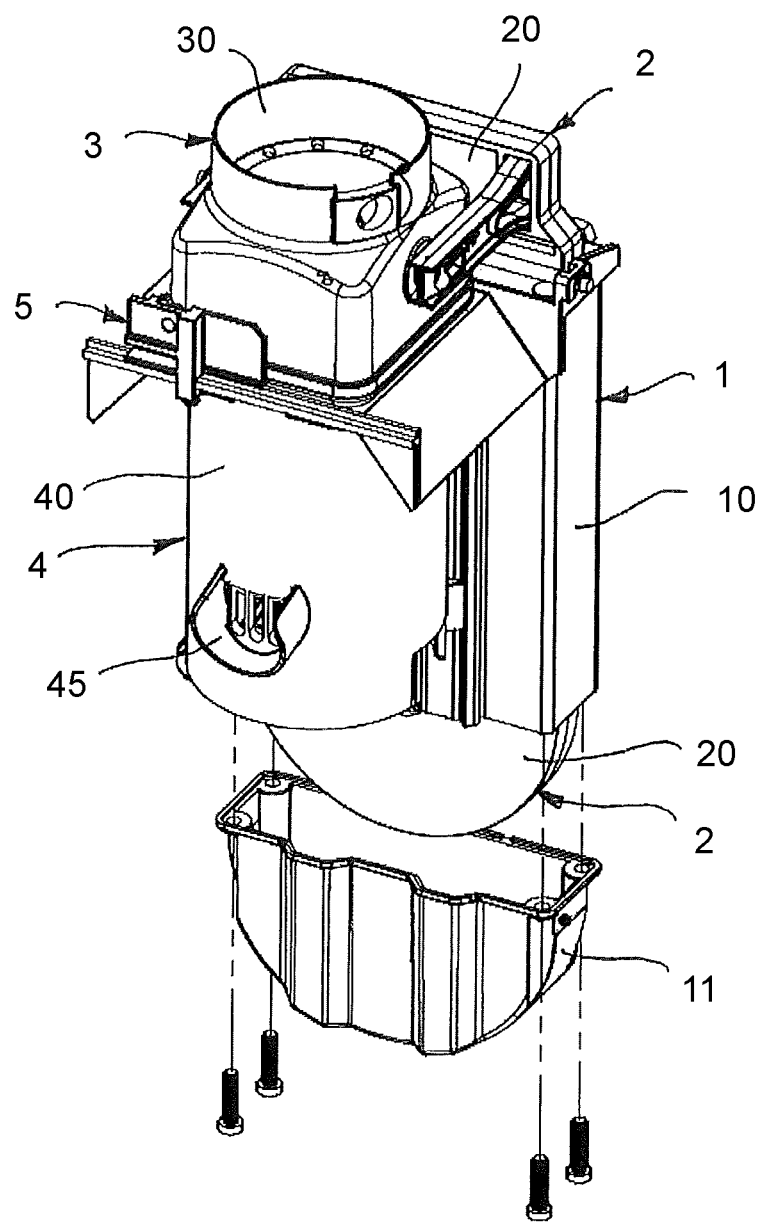
FIG. 1 is a partly exploded perspective view of a preferred embodiment of the brewer unit of the present invention.

FIG. 1 shows a preferred embodiment of a brewer unit according to the invention. The main components of the brewer unit are a main frame 1 assembly, a guide plate assembly 2, an upper cylinder assembly 3, a coaxial lower cylinder assembly 4, and a scraper unit 5. In addition, FIG. 1 shows a bottom cover 11 attached to the main frame by screws.

Figure 7:
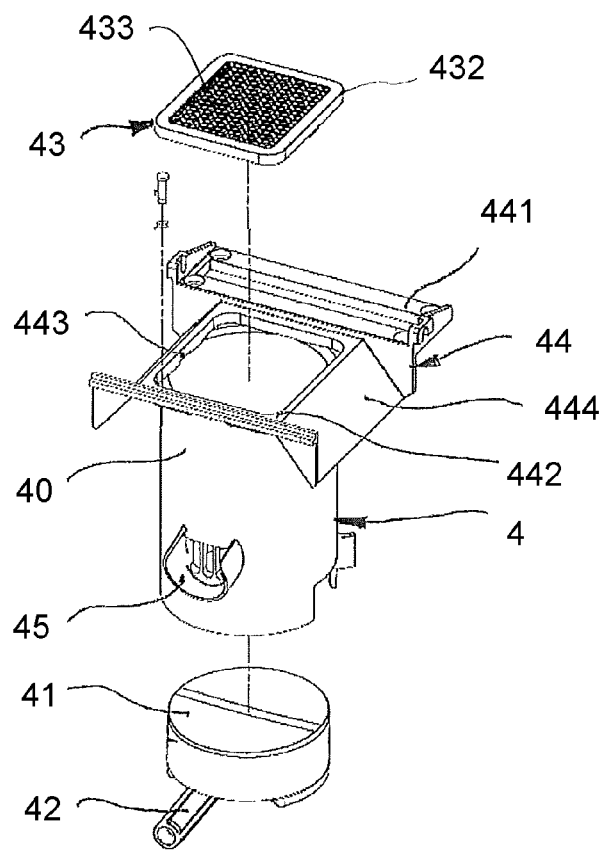
FIG. 7 is an exploded perspective view of a lower cylinder unit, incorporating filter unit and piston and included in the brewer unit of FIG. 1.

More precisely, a brewer unit for a hot beverage dispensing machine as illustrated in the drawings includes:

an upper cylinder 30 for receiving and containing hot water and a brewing material and having an open lower end;

a coaxial lower cylinder 40 having an open upper end;

a filter unit 43 (see FIG. 7) mounted over the upper end of said lower cylinder 40 preventing passage of the brewing material therethrough;

a reciprocal piston 41 fitted in the lower cylinder 40 (see FIG. 7);

a rotary drive shaft 14 (see FIG. 6 and FIG. 8) connected to the piston 41 by a crank 15 (see FIG. 9) and a piston rod 42 (see FIG. 7) to reciprocate the piston 41;

a first mechanism for lifting the upper cylinder 30 from the filter unit 43;

a scraper unit 5; and a second mechanism for moving the scraper unit 5 across the filter unit 43 to remove spent brewing material therefrom, said two mechanisms being driven from the drive shaft 14.

With reference to FIG. 7, the filter unit 43 may comprise a frame 432 and a filter 433 which is held in the frame 432. In the embodiment of FIG. 7, the frame 432 is rectangular and may have the shape of a square with rounded edges. It should be understood that the frame 432 may have shapes that are not rectangular. For example, it may have a round shape.

Figure 12:
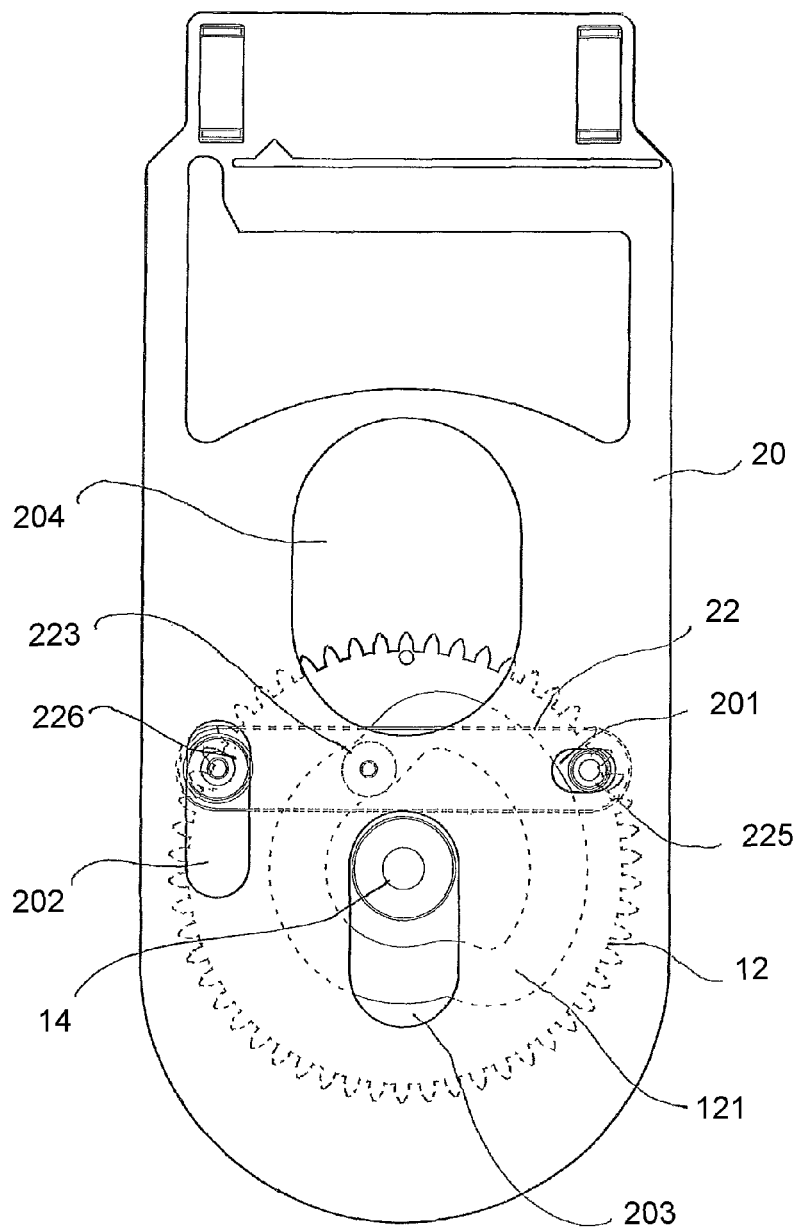
FIG. 12 is a front view of the guide plate and the larger toothed gear with the pivotal lever for lifting a lowering the guide plate assembly and a cam groove for maneuvering the pivot lever.

In accordance with a first aspect of the present invention:

a first toothed gear 12 (see FIG. 4) is fixed to the drive shaft 14;

said first mechanism includes a first cam mechanism having a first cam surface member 121 and a first cam follower member 223 (see FIG. 12 and FIG. 4) cooperating with the first cam surface member 121, one of said members 121, 223 being provided on a side of the first gear 12 and the other on a pivotal lever 22 (see FIG. 4), said pivotal lever 22 being operatively connected to the upper cylinder 30 for lifting and lowering it;

a second toothed gear 13 is smaller than the first one 12 and meshes therewith to be rotated thereby and has half as many teeth as the first one;

said second mechanism includes a second cam mechanism having a second cam surface member 131 (see FIG. 13) and a second cam follower member 213 (see FIG. 13 and FIG. 3) cooperating with the second cam surface member 131, one of the members 131, 213 in the second cam mechanism being provided on a side of the second gear 13 and the other on a pivotal arm 21 (see FIG. 3), said pivotal arm 21 being operatively connectable to the scraper unit 5 for moving the scraper unit 5 across the filter unit 43 (see FIG. 7 and FIG. 13) to remove spent brewing material therefrom when the upper cylinder 30 is lifted.

The simplified design of the present invention makes it possible to reduce the number of components from about 90 in a brewer marketed by a competitor to about 30.

Figure 2:
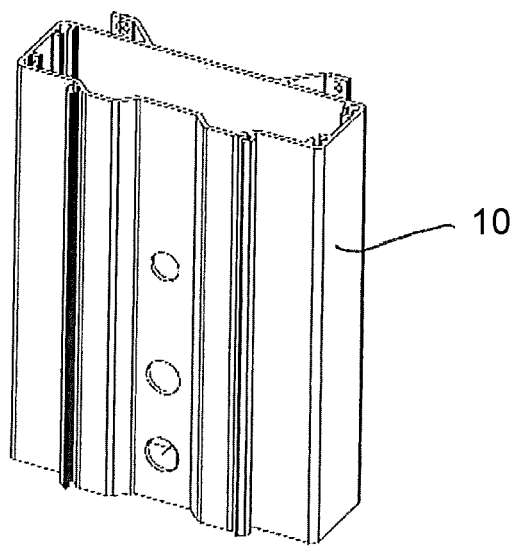
FIG. 2 is a perspective view of a main frame included in the brewer unit of FIG. 1.

The main frame assembly 1 includes a main frame 10 (see FIG. 1), which carries the two toothed gears 12, 13 and the lower cylinder assembly 4. As shown in FIG. 2, the main frame 10 may have the shape of an extruded tubular profile of generally rectangular cross-section and provided with necessary openings in the two larger opposite surfaces. The guide plate assembly 2 includes a reciprocal guide plate 20, which is movably carried by the main frame 10 and carries the upper cylinder assembly 3. The drive shaft 14, to which the first toothed gear 12 is fixed, may be journalled in the main frame 10.

Figure 4:
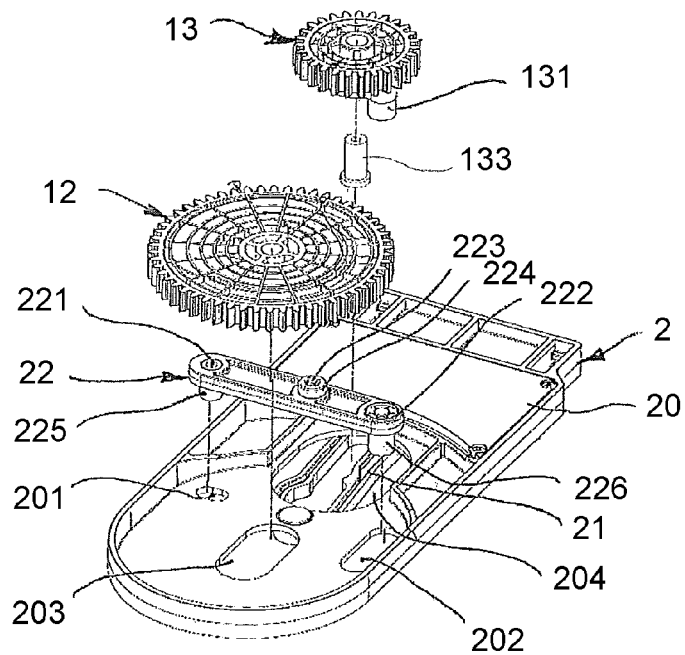
FIG. 4 is a perspective view of the guide plate of FIG. 3 as viewed from the front side and supplemented with two toothed gears and a pivotal lever included in the guide plate assembly.
Figure 13:
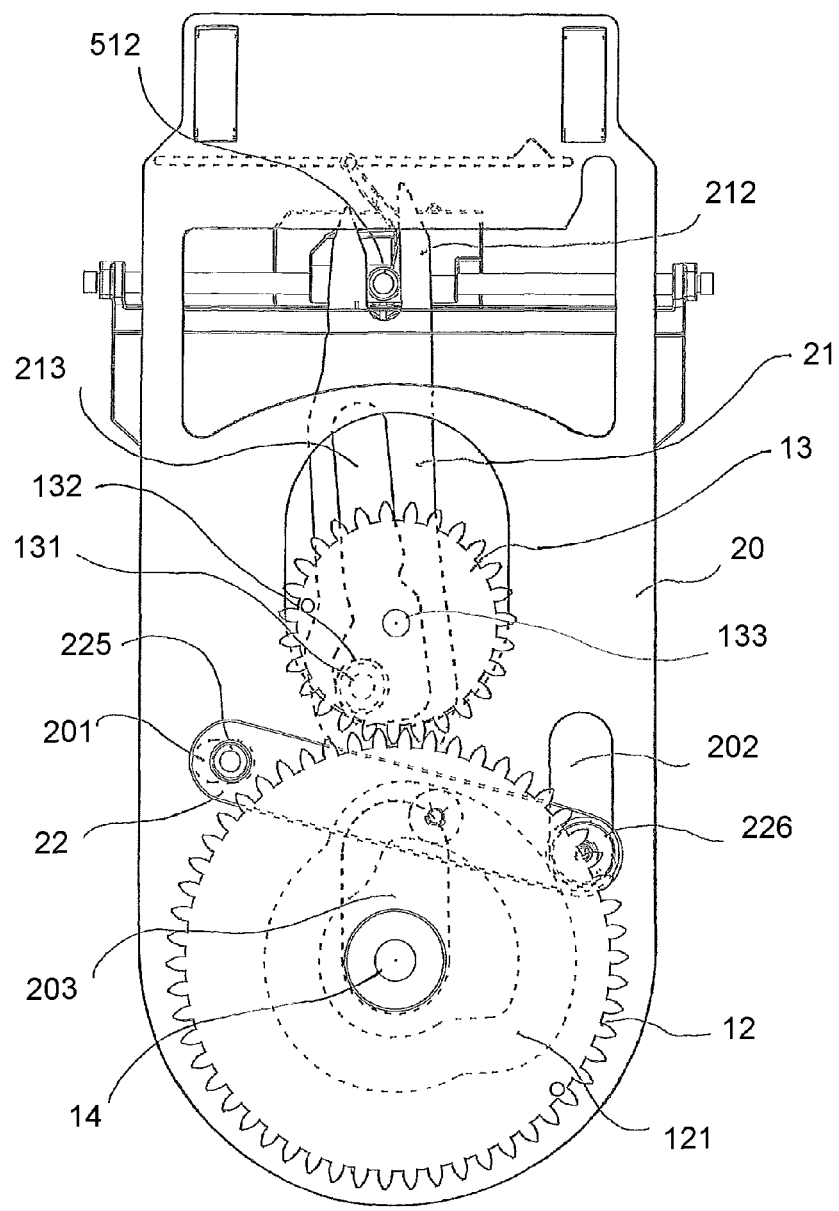
FIG. 13 is a rear view of the brewer unit of FIG. 1 with lifted upper cylinder and the pivotal arm during movement of the scraper unit to scrape the filter unit.

With reference to FIG. 4 and to FIG. 13, the second toothed gear 13 (i.e. the smaller gear) may be rotatably journalled in the main frame 10 on a pin or shaft 133 which may be fixed on the main frame 10.

Figure 3:
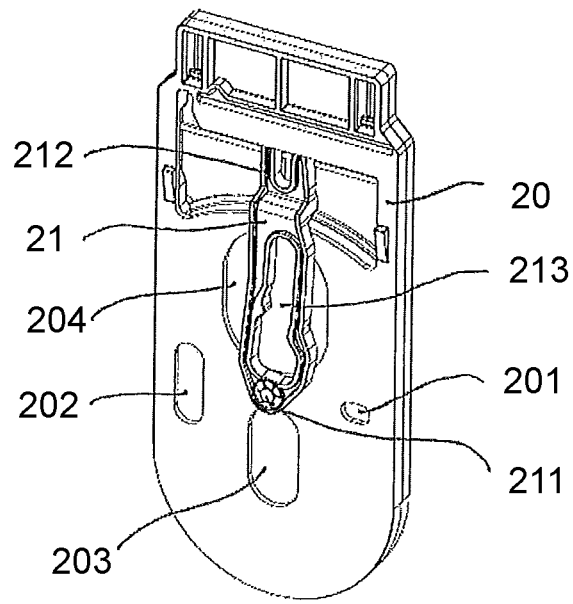
FIG. 3 is a perspective view of a rear side of a guide plate and a pivotal arm of a guide plate assembly included in the brewer unit of FIG. 1.

FIG. 3 is a perspective view of a rear side of a guide plate 20 and the pivotal arm 21 of the guide plate assembly 2 included in the brewer unit of FIG. 1. The guide plate 20 is displaceable upward and downward in the main frame 1. The pivotal arm 21 and its function will be described more in detail below.

FIG. 4 is a perspective view of the guide plate 20 as viewed from the rear side and supplemented with the two toothed gears 12 and 13 included in the main frame assembly 1 and the pivotal lever 22 included in the guide plate assembly 2. The two toothed gears 12 and 13 and the pivotal lever 22, which all are located on a rear side of the guide plate 20, will be described more in detail below.

The pivotal lever 22 of the first mechanism has a first end 222 pivotally attached to the main frame 10 and a second end 221 movably attached to the guide plate 20 for producing a reciprocal movement of the guide plate 20 with the upper cylinder 30 upon rotation of the larger first toothed gear 12. The first cam surface member is a groove 121 (FIG. 12) provided in a side surface of the larger toothed gear 12, and the first cam follower member includes a first stub shaft 223 provided between the two ends of the pivotal lever 22 (see FIG. 4). To reduce the friction between the first stub shaft 223 and the sides of the groove 121, an antifriction bearing 224 is suitably mounted on the first stub shaft 223. As further shown in FIG. 4, each of the two ends 221 and 222 of the lever 22 has a plug 225 and 226, respectively, extending through and guided by associated openings 201 and 202, respectively, in the guide plate 20. To make the desired reciprocal movement possible, the opening 201 is slightly elongated horizontally and opening 202 vertically in the brewer unit. Upon rotating the larger toothed gear 12, the stub shaft 223 on the pivotal lever 22 will follow the groove 121 and make the lever 22 pivot around its first end 222, so that the guide plate 20 is reciprocated in relation to the main frame 10.

Figure 5:
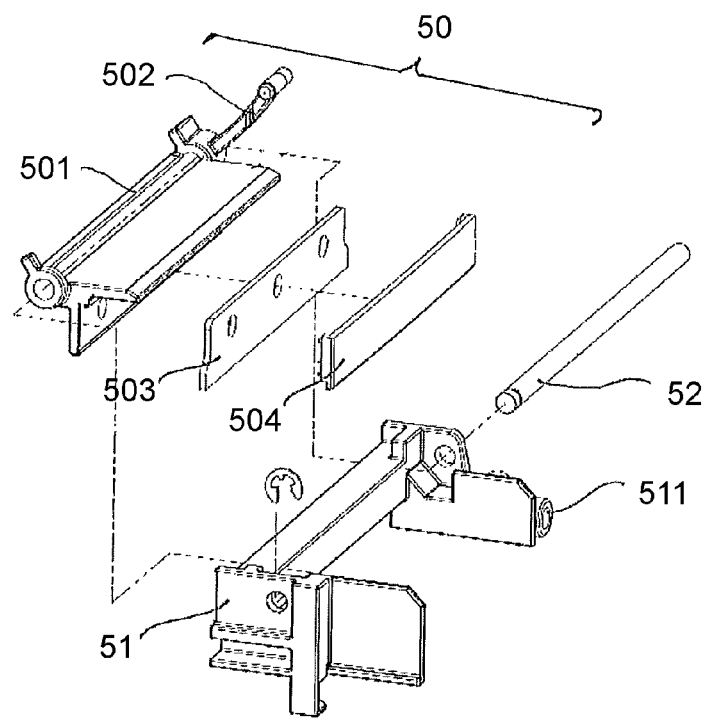
FIG. 5 is an exploded perspective view of a scraper unit included in the brewer unit of FIG. 1.

The pivotal arm 21 has a first end 211 pivotally attached to the front side of the guide plate 20 and a second free end 212, which is operatively connectable to the scraper unit 5 for moving the scraper unit 5 across the filter unit 43 to remove spent brewing material therefrom when the upper cylinder 30 is lifted. FIG. 5 is an exploded perspective view of a scraper unit 5 included in the brewer unit of FIG. 1. The scraper unit comprises a pivotal scraper 50, which is pivotally mounted in a scraper bracket 51 by means of a scraper shaft 52. In the shown preferred embodiment, the pivotal scraper 50 includes a pivotal blade holder 501 of generally L-shaped cross-section and having an arm 502 for pivoting the scraper, a replaceable scraper blade 503 and a cover 504 for securing the blade 503 to the holder 501. The scraper bracket 51 includes a side mounted guide 511 for guiding the scraping movement of the scraper unit 5, and also a protruding stub 512 (FIG. 13), which will be engaged by the free end 212 of the pivotal arm 21 when the scraper unit 5 is to be moved across the filter unit 43. As can be seen in FIG. 13 and in FIG. 3, the free end 212 of the pivotal arm 21 may be fork-shaped for engagement with the protruding stub 512 of the scraper unit 5.

Figure 6:
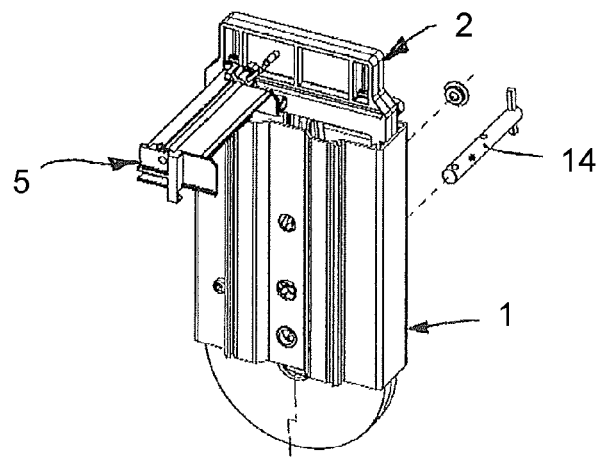
FIG. 6 is a perspective view of the guide plate assembly when mounted in the main frame, showing also the scraper unit and a drive shaft for rotating the larger toothed gear.
Figure 8:
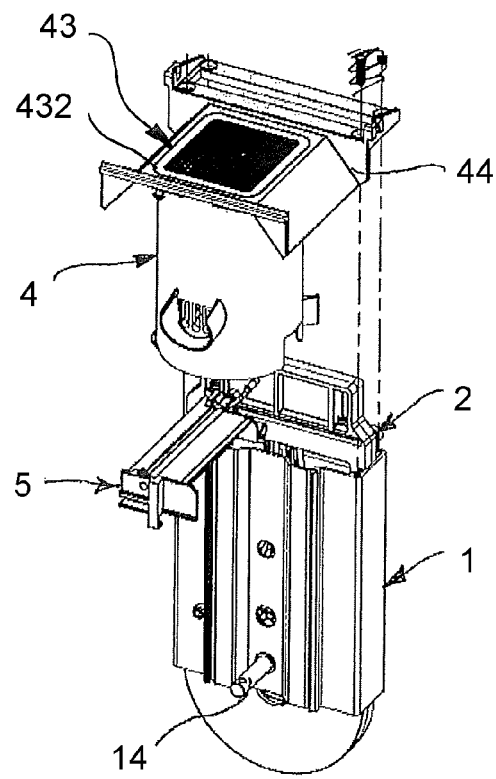
FIG. 8 is a perspective view showing the mounting of the lower cylinder unit on the main frame.

FIG. 6 is a perspective view of the guide plate assembly 2 when mounted in the main frame 10, showing also the scraper unit 5 and the drive shaft 14 for rotating the larger toothed gear 12. As shown in FIG. 8, the drive shaft 14 will project from the front side of the main frame 10 for connection to the piston 41.

Figure 10:
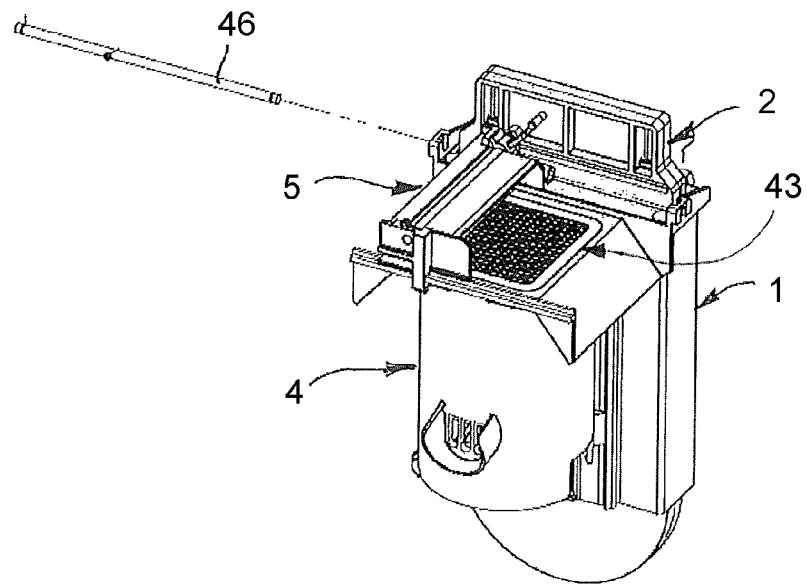
FIG. 10 is a perspective view showing the mounting of a guide bar on the main frame for guiding the reciprocating movement of the scraper unit of FIG. 5.

FIG. 7 is an exploded perspective view of the lower cylinder unit 4, incorporating the lower cylinder 40 with an outlet 45 for freshly made hot beverage, the piston 41 with its piston rod 42, the filter unit 43, and a bracket 44 for mounting the lower cylinder assembly 4 to the main frame assembly 1 as shown in FIG. 8. The bracket 44 includes a rectangular frame 441 to be attached to the top of the main frame assembly 1 with the top of the guide plate assembly 2 extending upward inside the rectangular frame 441. At the top of the lower cylinder 40 there is a horizontal top plate 442, which connects the lower cylinder 40 to one of the two longer sides of the rectangular frame 441. The top plate 442 has an opening 443 for receiving the filter unit 5 centrally over the lower cylinder 40, and an off-ramp 444 for spent brewing materiel discharged from the filter unit 43 by the scraper unit 5. Further, the bracket 44 has recesses for receiving a guide member 46, e.g. a rod as shown in FIG. 10, cooperating with the guide 511 in the scraper unit 5 for guiding the scraper unit 5 when moving over the filter unit 43.

Figure 9:
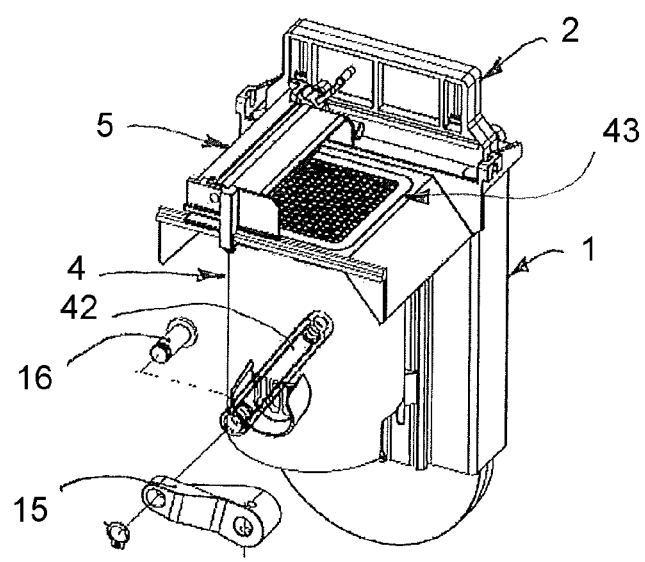
FIG. 9 is a perspective view showing the mounting of a crank interconnecting the drive shaft and a piston rod of the piston.

FIG. 9 shows a crank 15 that is to be mounted on the drive shaft 14 and connected to the lower end of the piston rod 42 by means of a stub shaft 16 for driving the piston 41 reciprocally. The larger gear 12 is driven (i.e. rotated) by the drive shaft 14. When the drive shaft 14 rotates and makes the piston 41 move downward, a vacuum is created between the piston and the filter unit 43, so that freshly made hot beverage is sucked from the upper cylinder 20 through the filter unit 43 and down into the lower cylinder 40. When the piston 41 is close to its bottom position, the freshly made hot beverage starts pouring out from the lower cylinder 40 through the side outlet 45. Thus, the drive shaft 14 and the larger gear 12 make one complete revolution for each dispensing and brewing cycle. Further, FIG. 9 shows that the scraper unit 5 extends to a front edge of the top plate 442 and will be guided thereby on moving across the filter unit 43.

Figure 11:
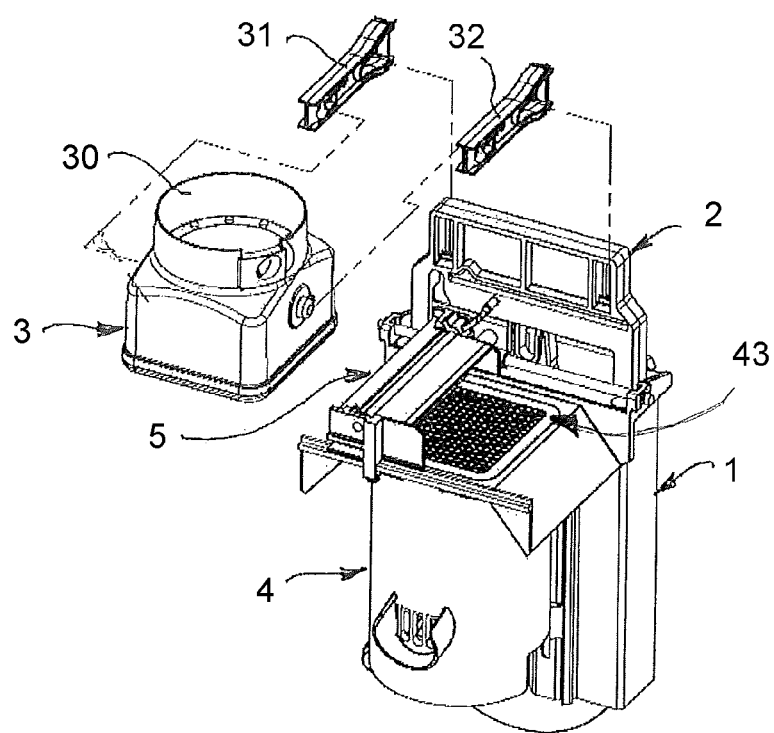
FIG. 11 is a perspective view showing the mounting of an upper cylinder included in the brewer unit of FIG. 1 to the guide plate.

FIG. 11 shows that the upper cylinder assembly 3 comprises the upper cylinder 30 and a pair of cantilevers 31 and 32 anchored in the top portion of the guide plate 20. The upper cylinder 30 is open at both ends and has a circular top and a bottom fitting the shape of the frame 432 of the filter unit 43 for sealing engagement therewith. To ensure a tight seal, the upper cylinder 30 may be pivotally suspended in the pair of cantilevers 31 and 32. There is also an arrangement for feeding hot water and solid brewing material, e.g. tea leaf or coffee grounds for one cup (or possibly several cups), to the upper cylinder 30, but such an arrangement constitutes no part of the present invention and is not shown in the drawings.

FIG. 13 is a rear view of the brewer unit of FIG. 1 with lifted upper cylinder and with the pivotal arm 21 moving the scraper unit 5 to scrape the filter unit 43. The pivotal arm 21 of the second mechanism has a first end 211 (see also FIG. 3)

pivotally attached to the guide plate 20 and a second end 212, which during its movements grips the stud 512 of the scraper unit 5 for producing a reciprocal movement of the scraper unit across the filter unit 43 upon completing two revolutions of the smaller toothed gear 13. A first revolution of the smaller toothed gear 13, which is driven by the larger gear 12 and has half as many teeth as the larger gear 12, produces a longitudinal reciprocal relative motion of the pivotal arm 21 without gripping the scraper unit 5, and the second revolution produces an angular reciprocal motion of the pivotal arm 21 to move the scraper unit 5 over the filter unit 43. This is accomplished in that the second cam surface member includes a second stub shaft 131 located on a side of the smaller toothed gear 13 to move in a circle, and the second cam follower member is an extended internal opening 213 (see FIG. 3 and FIG. 13) in the pivotal arm 21. Preferably, an antifriction bearing 132 is mounted on the second stub shaft 131 to reduce friction when the second stub shaft 131 on the rotating smaller gear 13 makes the pivotal arm 21 move. As is best shown in FIGS. 3 and 4, the guide plate 20 is provided with a first opening 203 for passage of the drive shaft 14 and a second opening 204 for passage of the circulating second stub shaft 131 on the rotating smaller gear 13, so as to make it possible for the guide plate assembly 2 to move in relation to the main frame assembly 1.

Figure 14:
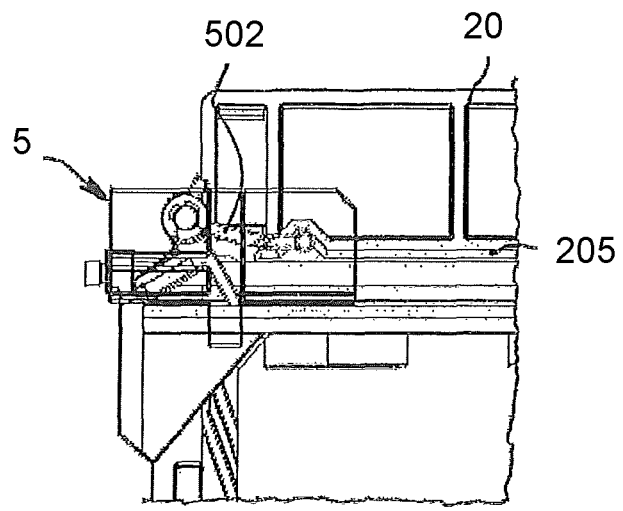
FIG. 14 is a front view of a top portion of the brewer unit of FIG. 1 with lowered upper cylinder and the scraper unit in a home position.
Figure 15:
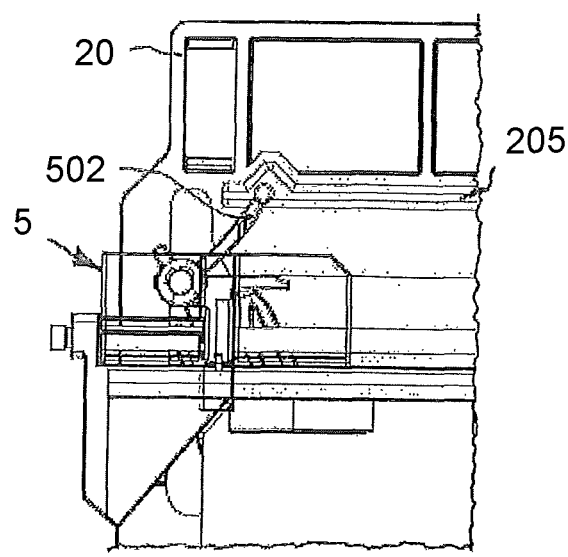
FIG. 15 is a view similar to FIG. 14 but with the upper cylinder lifted to rotate a pivotal scraper of the scraper unit to be in a position ready for scraping.

During a first half of a revolution of the larger gear 12, the guide plate assembly 2 is in its bottom position, the smaller gear 13 makes a first full revolution. The second cam surface member 131 will cooperate with the second cam follower member 213 such that the pivotal arm 21 is moved. The pivotal arm 21 reciprocates longitudinally but does not reach the stud 512 of the scraper unit 5 since the guide plate assembly 2 with its guide plate 20 is in its lower position. During the second half of the revolution of the larger gear 12, the first cam surface member 121 will cooperate with the first cam follower member 223 and thereby cause the pivotal lever 22 to pivot about its first end 222. The guide plate assembly 2 with the upper cylinder assembly 3 is lifted to its top position when the second end 221 of the pivotal lever 22 acts on the guide plate 20. The smaller gear 13 makes a second full revolution, and the pivotal arm 21 reciprocates longitudinally and angularly and engages the stud 512 of the scraper unit 5 to move the scraper unit 5 from a home position to an opposite end position while scraping the filter unit 43 and back to the home position. FIG. 14 is a rear view of a top portion of the brewer unit of FIG. 1 with lowered upper cylinder 30 and the scraper unit 5 in a home position. A lateral projection at the free end of the scraper arm 502 is engaged in a horizontal guide groove 205 provided in the top end of the guide plate 20 (see FIG. 15). Upon lifting the guide plate assembly 2 with upper cylinder 30 to its top position shown in FIG. 15, the horizontal guide groove 205 in the guide plate 20 interacts with the free end of the scraper arm 502 and the scraper arm 502 rotates the pivotal scraper 50 about an eighth of a full revolution, so that the scraper blade 503 will engage the filter unit 43 substantially perpendicularly. When the guide plate assembly 2 is in its upper position, the free end 212 of the pivotal arm 21 can engage the protruding stub 512 of the scraper unit 5 (see FIG. 13) and cause the scraper unit 5 to move over the filter unit 43 to remove spent brewing material from the surface of the filter unit 43.

Whereas the invention has been shown and described in connection with the preferred embodiments thereof it will be understood that many modifications, substitutions, and additions may be made which are within the intended broad scope of the following claims. From the foregoing, it can be seen that the present invention accomplishes the stated object of the invention.

INDUSTRIAL APPLICABILITY

The brewer unit of the present invention is applicable in machines for dispensing freshly made hot beverages such as coffee or tea, for example, to personnel at working sites.

The invention claimed is:
1. A brewer unit for a hot beverage dispensing machine, said brewer unit comprising:
  an upper cylinder (30) for receiving and containing hot water and a brewing material and having an open lower end;
  a coaxial lower cylinder (40) having an open upper end;
  a filter unit (43) mounted over the upper end of said lower cylinder (40) preventing passage of the brewing material therethrough and directly fitting the open lower end of the upper cylinder (30);
  a reciprocal piston (41) fitted in the lower cylinder (40);
  a rotary drive shaft (14) connected to the piston (41) by a crank (15) and a piston rod (42) to reciprocate the piston (41);
  a first mechanism for lifting the upper cylinder (30) from the filter unit (43);
  a scraper unit (5); and
  a second mechanism for moving the scraper unit (5) across the filter unit (43) to remove spent brewing material therefrom, said two mechanisms being driven from the drive shaft (14);
  wherein:
    the brewer unit further comprises a first toothed gear (12) fixed to the drive shaft (14);
    said first mechanism comprises a first cam mechanism having a first cam surface member (121) and a first cam follower member (223) cooperating with the first cam surface member (121), one of said members (121 223) being provided on a side of the first gear (12) and the other on a pivotal lever (22), said pivotal lever (22) being operatively connected to the upper cylinder (30) for lifting and lowering it;
    the brewer unit further comprises a second toothed gear (13) that is smaller than the first toothed gear (12) and meshes therewith so as to be rotated thereby, the second toothed gear (13) having half as many teeth as the first one;
    said second mechanism comprises a second cam mechanism having a second cam surface member (131) and a second cam follower member (213) cooperating with the second cam surface member (131), one of the members (131, 213) in the second cam mechanism being provided on a side of the second gear (13) and the other on a pivotal arm (21), said pivotal arm (21) being operatively connectable to the scraper unit (5) for moving the scraper unit (5) across the filter unit (43) to remove spent brewing material therefrom when the upper cylinder (30) is lifted;
    a first revolution of the second toothed gear (13) produces a longitudinal reciprocal relative motion of the pivotal arm (21) without gripping the scraper unit (5); and
    a second revolution of the second toothed gear (13) produces an angular reciprocal motion of the pivotal arm (21) to grip and move the scraper unit (5) over the filter unit (43).

2. A brewer unit as claimed in claim 1, further comprising:
- a stationary main frame (10) carrying the two toothed gears (12, 13) and the lower cylinder (40); and
- a reciprocal guide plate (20) movably carried by the main frame (10) and carrying the upper cylinder (30).

3. A brewer unit as claimed in claim 2, wherein the pivotal lever (22) of the first mechanism comprises:
- a first end (222) pivotally attached to the main frame (10); and
- a second end (221) movably attached to the guide plate (20) for producing a reciprocal movement of the guide plate (20) with the upper cylinder (30) upon rotation of the larger first toothed gear (12).

4. A brewer unit as claimed in claim 3, wherein:
- the first cam surface member is a groove (121) provided in a side surface of the larger toothed gear (12); and
- the first cam follower member comprises a first stub shaft (223) provided between the two ends of the pivotal lever (22).

5. A brewer unit as claimed in claim 4, wherein an antifriction bearing (224) is mounted on the first stub shaft (223).

6. A brewer unit as claimed in claim 2, wherein:
- the pivotal arm (21) of the second mechanism has a first end (211) pivotally attached to the guide plate (20) and a second end (212).

7. A brewer unit as claimed in claim 6, wherein:
- the scraper unit (5) has two axial ends, one of the two axial ends having a projecting stud (512); and
- the free end (212) of the pivotal arm (21) is forked for engaging the projecting stud (512) between the fork prongs during the second revolution of the smaller toothed gear (13).

8. A brewer unit as claimed in claim 7, wherein the scraper unit (5) starts scraping when it starts moving.

9. A brewer unit as claimed in claim 8, wherein the scraper unit (5) comprises a scraper (50) that is pivotally mounted in a scraper bracket (51) carrying the projecting stud (512), the scraper (50) having a longitudinal axis and a generally L-shaped cross-section, and wherein an arm (502) interconnecting the scraper (50) and the guide plate (20) makes the scraper (50) rotate about one eighth of a revolution around its longitudinal axis upon lifting of the upper cylinder (30).

10. A brewer unit as claimed in claim 1, wherein:
- the second cam surface member comprises a second stub shaft (131) located on a side of the second toothed gear (13); and
- the second cam follower member is an extended internal opening (213) in the pivotal arm (21).

11. A brewer unit as claimed in claim 10, wherein an antifriction bearing (132) is mounted on the second stub shaft (131).

* * * * *